United States Patent
Ishida et al.

(10) Patent No.: US 6,529,341 B1
(45) Date of Patent: Mar. 4, 2003

(54) MAGNETIC RECORDING/REPRODUCTION DEVICE USING PREFORMAT INFORMATION

(75) Inventors: Tatsuaki Ishida, Sakai (JP); Taizou Hamada, Katano (JP); Kiyokazu Tohma, Hirakata (JP); Hiroshi Ryonai, Osaka (JP); Keizou Miyata, Moriguchi (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/530,314

(22) PCT Filed: Oct. 29, 1998

(86) PCT No.: PCT/JP98/04913
§ 371 (c)(1),
(2), (4) Date: Jul. 25, 2000

(87) PCT Pub. No.: WO99/24971
PCT Pub. Date: May 20, 1999

(30) Foreign Application Priority Data

Nov. 12, 1997 (JP) .............................................. 9-309116

(51) Int. Cl.[7] ................................................. G11B 5/09
(52) U.S. Cl. ....................... 360/48; 360/49; 360/77.08; 360/78.14; 360/16; 360/135
(58) Field of Search .................... 360/48, 49, 77.08, 360/78.14, 55, 16, 17, 51, 135

(56) References Cited

U.S. PATENT DOCUMENTS

| | | |
|---|---|---|
| 3,614,756 A | 10/1971 | McIntosh et al. |
| 3,869,711 A | 3/1975 | Bernard et al. |
| 4,157,576 A | 6/1979 | Hack et al. |
| 4,422,106 A | 12/1983 | Sawazaki |
| 4,525,828 A | 7/1985 | Higashiyama et al. |
| 4,598,327 A | 7/1986 | Jen et al. |
| 4,737,869 A | 4/1988 | Sugaya et al. |
| 4,835,632 A | 5/1989 | Shih et al. |
| 5,296,995 A * | 3/1994 | Yonezawa et al. ........... 360/135 |
| 5,677,819 A | 10/1997 | Seko et al. |
| 5,703,733 A * | 12/1997 | Suzuki et al. ............. 360/77.01 |
| 5,875,083 A | 2/1999 | Oniki et al. |
| 6,034,836 A * | 3/2000 | Lee ........................... 360/77.08 |

FOREIGN PATENT DOCUMENTS

| | | |
|---|---|---|
| EP | 0129708 | 1/1985 |
| EP | 0387104 | 9/1990 |
| EP | 0611208 A2 | 8/1994 |
| EP | 0915456 A1 | 5/1999 |
| FR | 2238205 | 2/1975 |
| GB | 1462914 | 1/1977 |
| GB | 2164483 A | 3/1986 |
| JP | 51-25723 | 8/1976 |
| JP | 56-7243 | 1/1981 |
| JP | 56-41528 | 4/1981 |

(List continued on next page.)

OTHER PUBLICATIONS

Patent Abstracts of Japan, Publication No. 09251637 A, Publication Date Sep. 22, 1997, 1 page.
Patent Abstracts of Japan, Publication No. 09007143 A, Publication Date Jan. 10, 1997, 1 page.

(List continued on next page.)

Primary Examiner—Alan T. Faber
(74) Attorney, Agent, or Firm—Rosenthal & Osha L.L.P.

(57) ABSTRACT

A magnetic disk for a magnetic recording/reproduction device includes a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to at least one signal selected from a clock signal and a synchronous signal has a recording width that is larger than a recording track width of the magnetic head in a radial direction of the magnetic disk.

29 Claims, 11 Drawing Sheets

FOREIGN PATENT DOCUMENTS

| | | |
|---|---|---|
| JP | 56-145567 | 11/1981 |
| JP | 57-24032 | 2/1982 |
| JP | 57-109133 | 7/1982 |
| JP | 57-109134 | 7/1982 |
| JP | 57-158004 | 9/1982 |
| JP | 57-158038 | 9/1982 |
| JP | 57-158039 | 9/1982 |
| JP | 57-158040 | 9/1982 |
| JP | 57-158041 | 9/1982 |
| JP | 58-94136 | 6/1983 |
| JP | 58-94137 | 6/1983 |
| JP | 60-209915 | 10/1985 |
| JP | 61-66215 | 4/1986 |
| JP | 61-71480 | 4/1986 |
| JP | 62-8322 | 1/1987 |
| JP | 64-73575 | 3/1989 |
| JP | 1-92970 | 4/1989 |
| JP | 4-251440 | 9/1992 |
| JP | 6-139734 | 5/1994 |
| JP | 7-226044 | 8/1995 |
| JP | 8-17155 | 1/1996 |
| JP | 9-7143 | 1/1997 |
| JP | 9-251637 | 9/1997 |

OTHER PUBLICATIONS

Patent Abstracts of Japan, Publication No. 07226044 A, Publication Date Aug. 22, 1995, 1 page.

Patent Abstracts of Japan, Publication No. 61071480 A, Publication Date Apr. 12, 1986, 1 page.

Patent Abstracts of Japan, Publication No. 06139734 A, Publication Date May 20, 1994, 1 page.

Patent Abstracts of Japan, Publication No. 04251440 A, Publication Date Sep. 7, 1992, 1 page.

Japanese Office Action dated Jun. 4, 2002 and Translation of Reference Cited for Supplemental IDS, 4 pages.

Patent Abstracts of Japan, English translation of abstract, "Magnetic Transfer Recording System", Publication No. 57024032A, Date of Publication Aug. 2, 1982, one page.

Patent Abstracts of Japan, English translation of abstract, "Magnetic Transferring and Recording System", Publication No. 57109133A, Date of Publication Jul. 7, 1982, one page.

Patent Abstracts of Japan, English translation of abstract, "Magnetic Transferring and Recording Method", Publication No. 57109134A, Date of Publication Jul. 7, 1982, one page.

Patent Abstracts of Japan, English translation of abstract, "Magnetic Transfer Recorder", Publication No. 57158038A, Date of Publication Sep. 29, 1982, one page.

Patent Abstracts of Japan, English translation of abstract, "Magnetic Transfer Recorder", Publication No. 57158039A, Date of Publication Sep. 29, 1982, one page.

Patent Abstracts of Japan, English translation of abstract, "Magnetic Transfer Recorder", Publication No. 57158040A, Date of Publication Sep. 29, 1982, one page.

Patent Abstracts of Japan, English translation of abstract, "Magnetic Transfer Recorder", Publication No. 57158041A, Date of Publication Sep. 29, 1982, one page.

Patent Abstracts of Japan, English translation of abstract, "Magnetic Transferring Recorder", Publication No. 58094136A, Date of Publication Jun. 4, 1983, one page.

Patent Abstracts of Japan, English translation of abstract, "Magnetic Transferring Recorder", Publication No. 58094137A, Date of Publication Jun. 4, 1983, one page.

Patent Abstracts of Japan, English translation of abstract, "Servo Signal Recording Method", Publication No. 60209915A, Date of Publication Oct. 22, 1985, one page.

Patent Abstracts of Japan, Publication No. 01092970, Publication Date Apr. 12, 1989, 1 page.

Patent Abstracts of Japan, Publication No. 56145567, Publication Date Nov. 12, 1981, 1 page.

* cited by examiner

MAGNETIC RECORDING/REPRODUCTION DEVICE USING PREFORMAT INFORMATION

TECHNICAL FIELD

The present invention relates to a magnetic recording/reproduction device with high recording density and large capacity.

BACKGROUND ART

The recording density of magnetic recording/reproduction apparatus is constantly increasing to realize small size and large capacity. Especially, in the field of hard disk drives, which are typical magnetic writing devices, an areal recording density of more than 1 Gbit/in$^2$ is already available on the market, and an areal recording density of 10 Gbit/in$^2$ is expected within a couple of years. The technology proceeds with a rapid pace.

One of the primary technical factors that has enabled such high recording densities is the increase of linear recording density, due to improvements of the magnetic recording medium, the head-disk interface performance, and new signal processing methods such as "partial response". However, in recent years, the rate of increase of the track density has exceeded that of the linear recording density, and has therefore become a primary factor when it comes to increasing the areal recording density. Practical use of magnetoresistive heads, whose read-back signal performance is superior to that of conventional inductive type heads, has contributed to the progress in the track density. At present, it is possible to read signals from tracks of only a few microns width with good S/N ratio by using a magnetoresistive type head. Furthermore, it is expected that with further improvement of the head performance, the track pitch will reach the sub-micron range in the near future.

To read a signal with high S/N ratio by tracing such a narrow track, the tracking servo technique for the magnetic head plays a very important role. For example, a conventional hard disk has areas that are distributed at predetermined angles over an entire revolution of the disk, i.e. 360 degrees. Signals such as a tracking servo signal, an address signal and a clock signal are written into these areas. In this specification, these signals are referred to as "preformat" signals. A magnetic head can monitor its position by reading these signals in predetermined intervals, and correctly trace a track while correcting any displacement in the radial direction of the magnetic disk.

The preformat signals, i.e. tracking servo signal, address signal, clock signal etc., serve as reference signals for precisely tracing a track with the magnetic head. Therefore, precise track positioning is required for these information signals. Present hard disk drives are equipped with a built-in magnetic head that records the tracking servo signal, the address signal, the clock signal etc. by using a special servo-track writing device, after the magnetic disks and the magnetic heads have been installed in the drive. The track positioning can be realized with the necessary precision when the recording is performed while precisely controlling the position of the built-in magnetic head with an external actuator, which is part of the servo-track writing device.

To this date, there were the following problems with preformat recordings of servo signals, address information signals, and clock signals with a magnetic head using the above-described dedicated servo track recording device.

First of all, recording with a magnetic head is basically linear recording based on the relative motion between the head and the recording medium. Therefore, with the above method of recording while precisely controlling the position of the magnetic head using a dedicated servo-track recording device, not only is a lot of time required for the preformat recording, but also the dedicated servo track recording device is relatively expensive, which leads to a considerable increase in cost.

Secondly, because of the widening of the recording field caused by the spacing between head and medium and the pole-shaped recording head, the magnetization transition of the preformat-recorded track edges lacks sharpness. The current tracking servo technology is to detect the misplacement of the magnetic head in the radial direction of the disk with the change in the reproduction output amplitude when scanning the disk with the head at a distance from the track. Consequently, there is a need not only for a good S/N ratio when precisely tracking the track with the head when reproducing the data information signal recorded between the preformatted recording areas, but also for a sharp change in the reproduction output amplitude when the head is misplaced away from the track (i.e. the off-track characteristics). The above-mentioned problem goes against this need, and makes the realization of precise tracking servo technology for future sub-micron track recordings very difficult.

On the other hand, in the specification of Tokkai Hei 10-40544 (international application number: PCT/JP97/02519), the inventors of the present invention proposed a preformatting technology, wherein a magnetization pattern corresponding to a pattern in the surface of a master information carrier is recorded on a magnetic recording medium by contacting the surface of the magnetic recording medium with the surface of the master information carrier, which has an orderly ferromagnetic pattern corresponding to a preformat information signal formed on the surface of a substrate.

With the configuration disclosed in the specification of Tokkai Hei 10-40544, a magnetization pattern corresponding to the ferromagnetic film pattern on the master information carrier is recorded on the magnetic recording medium with the recording magnetic field generated by the ferromagnetic film pattern on the master information carrier, which is magnetized in one direction. In other words, by forming a ferromagnetic film pattern corresponding to the tracking servo signal, the address information signal, and the clock signal on the surface of the master information carrier, a preformat recording corresponding to these signals can be recorded on the magnetic recording medium.

The characteristic feature of this configuration is the static en-bloc recording without relative movement between the master information carrier and the recording medium. Due to this feature, the technique disclosed in Tokkai Hei 10-40544 displays the following useful effects with regard to the problems of prior preformat recording.

Firstly, because the surface is recorded en bloc, the time required for the preformat recording is much shorter than in conventional recording methods using a magnetic head. Moreover, an expensive servo recording device for recording while precisely controlling the position of the magnetic head is unnecessary. Consequently, it is possible to increase the productivity of the preformat recording considerably, and to reduce the production costs.

Secondly, because the recording is static without a relative movement between the master information carrier and the recording medium, the spacing between the two during recording can be minimized by contacting the surface of the master information carrier with the surface of the magnetic recording medium. Moreover, there is no widening of the magnetic recording field due to the pole shape of the magnetic head, as there is in the case of recording with a magnetic head. Thus, the magnetization transition at the preformat-recorded track edges is much sharper than with conventional recording with a magnetic head, so that a more precise tracking becomes possible.

Several preferable configurations have been suggested to let the preformat-recorded signal pattern provide optimum performance for handling tracking servo signals, address signals and clock signals. However, since in these conventional techniques, which use a special servo-track writing device, a separate magnetic head is built into the drive, there are severe limitations to the magnetization pattern of the preformat-recorded signal.

For example, the recording track width of a magnetic head in a magnetic recording/reproduction device, such as a hard disk drive, is usually narrower than the track pitch, and a guard band of a certain width is provided between adjacent recording tracks. The recording track width and the guard band width cannot be deliberately changed according to the signal type to be preformat-recorded. However, there are instances, when the performance for handling tracking servo signals, address signals and clock signals can be improved by using wider recording track widths and possibly letting the signals traverse a plurality of consecutive tracks. Also, in another instance where interference of magnetization patterns between neighboring tracks becomes a problem, it is rather preferable to provide smaller recording track widths and larger guard band widths.

Moreover, in magnetic recording/reproduction devices such as video-tape recorders, so-called "azimuth recording" is employed, where the recording gaps are inclined with a constant inclination angle against the direction of the track width. This, among other merits, reduces cross-talk noise from adjacent tracks and enables a recording without guard band. If it were possible to perform a preformat recording in a magnetic disk device with such an arbitrary inclination of the magnetization pattern against the track width direction, several configurations could be suggested to attain better characteristics. However, in the conventional methods for recording preformat signals with a magnetic head that is built into the drive, it is not possible to obtain recording gaps that are arbitrarily inclined against the track width direction.

It is an object of the present invention to solve these problems of the prior art and provide a magnetic recording/ reproduction disk device for magnetic preformat-recording patterns that can provide optimum performance for handling tracking servo signals, address signals, and clock signals.

DISCLOSURE OF THE INVENTION

In order to attain these objects, a first configuration of the hard disk drive of the present invention comprises at least one disk-shaped magnetic recording medium; a rotation mechanism for supporting the magnetic recording medium with a rotating shaft and for rotating the magnetic recording medium; at least one magnetic head for (a) recording information signals on the magnetic recording medium and (b) reading information signals recorded on the magnetic recording medium; and a driving mechanism for moving the magnetic head at least in a radial direction across the magnetic recording medium to perform tracking. A magnetization bit-pattern corresponding to a preformat information signal comprising at least a tracking servo signal has been recorded on the magnetic recording medium. The magnetization bit-pattern is recorded by contacting the surface of the magnetic recording medium with the surface of a master information carrier, which has a pattern that is formed of a ferromagnetic film deposited on a surface of a substrate and corresponds to the preformat information signal, and applying a magnetic field in a disk in-plane direction of the magnetic recording medium. At least a portion of the magnetization bit-pattern has a recording width different from the recording track width of the magnetic head in a radial direction of the magnetic recording medium. According to this first configuration of the magnetic recording/ reproduction device, a magnetization pattern can be realized that is designed to provide optimum performance for all different kinds of signals in a preformat recording on a magnetic recording/reproduction device. As a result, a magnetic recording/reproduction device with excellent performance in such areas as tracking performance, seek performance and reliability can be provided at lower cost than before.

Moreover, in the first configuration of the hard disk drive of the present invention, it is preferable that a portion of the magnetization bit-pattern corresponding to at least one signal selected from a clock signal and a synchronous signal has a recording width larger than a recording track width of the magnetic head in a radial direction of the magnetic recording medium. According to this preferable configuration, the width of the guard band at the recording areas for the clock signal and the synchronous signal can be made extremely small, so that when the magnetic head deviates even only a little from the recording track to be scanned, a decrease of the read signal amplitude can be suppressed.

Moreover, in the first configuration of the hard disk drive of the present invention, it is preferable that a portion of the magnetization bit-pattern corresponding to at least an address signal has a recording width smaller than a recording track width of the magnetic head in a radial direction of the magnetic recording medium. According to this preferable configuration, there are no magnetization interference areas between adjacent bits in the address information areas, so that noise is suppressed during reproduction. As a result, address detection errors and decrease in the seek velocity are considerably suppressed.

Moreover, in the first configuration of the hard disk drive of the present invention, it is preferable that a portion of the magnetization bit-pattern corresponding to at least one signal selected from a clock signal and a synchronous signal traverses a plurality of consecutive recording tracks in a radial direction of the magnetic recording medium. According to this preferable configuration, no guard band has to be provided at the recording area for the clock signal and the synchronous signal, so that when the magnetic head deviates even only a little from the recording track to be scanned, the decrease of the read signal amplitude can be eradicated almost completely.

Moreover, a second configuration of the hard disk drive of the present invention comprises at least one disk-shaped magnetic recording medium; a rotation mechanism for supporting the magnetic recording medium with a rotating shaft and for rotating the magnetic recording medium; at least one magnetic head for (a) recording information signals on the magnetic recording medium and (b) reading information signals recorded on the magnetic recording medium; and a driving mechanism for moving the magnetic head at least in a radial direction across the magnetic recording medium to perform tracking. A magnetization bit-pattern corresponding to a preformat information signal comprising at least a tracking servo signal has been recorded on the magnetic recording medium. The magnetization bit-pattern is recorded by contacting the surface of the magnetic recording medium with the surface of a master information carrier, which has a pattern that is formed of a ferromagnetic film deposited on a surface of a substrate and corresponds to the preformat information signal, and and applying a magnetic field in a disk in-plane direction of the magnetic recording medium. At least in a portion of the magnetization bit-pattern the magnetic transition region between bits is inclined with respect to a read gap of the magnetic head. According to this second configuration of the hard disk drive, a magnetization pattern that offers enhanced performance that is optimal for all different kinds of information signals such as tracking servo signals, clock signals, address signals and synchronous signals can be realized.

Moreover, in the second configuration of the hard disk drive of the present invention, it is preferable that at least in a portion of the magnetization bit-pattern corresponding to a tracking servo signal, an inclination angle is defined by (a) the magnetic transition region between bits and (b) a read gap of the magnetic head, and that the magnetic recording/reproduction device further comprises a means for controlling the tracking of the magnetic head by detecting a phase change of a read waveform of the tracking servo signal that accompanies a displacement of the magnetic head in a radial direction of the magnetic recording medium. According to this second configuration of the hard disk drive, the magnetic head can detect a truly consecutive and linear phase change of the read signal that is proportional to the position of the magnetic head in the radial direction of the magnetic disk. As a result, servo tracking techniques based on the phase detection of the read signal can be provided with an excellent tracking precision.

Moreover, a first configuration of the magnetic recording/reproduction device of the present invention comprises at least one disk-shaped magnetic recording medium; a rotation mechanism for supporting the magnetic recording medium with a rotating shaft and for rotating the magnetic recording medium; at least one magnetic head for (a) recording information signals on the magnetic recording medium and (b) reading information signals recorded on the magnetic recording medium; and a driving mechanism for moving the magnetic head at least in a radial direction across the magnetic recording medium to perform tracking. A magnetization bit-pattern corresponding to a preformat information signal comprising at least a tracking servo signal has been recorded on the magnetic recording medium. The magnetization bit-pattern is recorded by contacting the surface of the magnetic recording medium with the surface of a master information carrier, which has a pattern that is formed of a ferromagnetic film deposited on a surface of a substrate and corresponds to the preformat information signal. At least a portion of the magnetization bit-pattern is magnetized substantially parallel to a radial direction of the magnetic recording medium. According to this third configuration of the hard disk drive, the following effects can be attained: When the signal bit length in the circumferential direction of the magnetic disk is small and the recording width in the radial direction is relatively large, demagnetization losses due to the demagnetizing field accompanying this recording bit shape may occur, and a sufficient recording signal strength cannot be attained. However, in accordance with the third configuration of the hard disk drive, a sufficient recording signal strength can be easily attained even when the signal bit length in the circumferential direction of the magnetic disk is small and the recording width in the radial direction is relatively large, because the magnetization remains in a direction where demagnetization losses due to the demagnetizing field do not occur as easily.

BEST MODE FOR CARRYING OUT THE INVENTION

The following is a detailed description of the present invention with reference to the accompanying drawings.

The basic configuration of a magnetic recording/reproduction device according to the present invention is similar to that of a conventional device in that magnetic disks are supported by a rotating axis of, for example, a motor and can be rotated with a certain angular velocity.

Magnetic heads are installed above recording surfaces of the magnetic disks. The magnetic heads can record information signals onto the magnetic disks, and read recorded information signals from the magnetic disks. The magnetic heads are provided with a driving mechanism that can move the magnetic heads at least in a radial direction across the magnetic disks. The recording tracks on the magnetic disks have the form of concentric rings or of a spiral. With this configuration, the magnetic heads can scan all recording tracks while moving radially across the magnetic disks. The driving mechanism is linked to a signal detector for tracking servo signals read out by the magnetic heads. The function of the driving mechanism is to perform the tracking so that the magnetic heads can precisely scan the intended recording tracks. Usually, a voice coil motor or a linear motor is used for the driving mechanism, but to enhance the tracking performance, the driving mechanism can be used in combination with a variety of micro-actuators.

The number of magnetic disks that are stacked in the device of the present invention is not limited to one, and, as necessary, a plurality of disks can be used. In accordance with the number of magnetic disks, more than one magnetic head can be installed. The magnetic disk does not have to be permanently fixed to the rotating supporting member, but can be an exchangeable disk that can be inserted into and retrieved from the device.

A magnetic bit pattern adapted to tracking servo signals, address signals and clock signals is pre-recorded on the magnetic disk of the present invention. The magnetic bit pattern is formed using a master information carrier: A ferromagnetic pattern corresponding to the preformat information signal is formed on the surface of a substrate of the master information carrier. The magnetic bit pattern is then recorded by contacting the surface of the master information carrier with the surface of the magnetic disk. The conventional method of recording a preformat information signal with a special servo-track writing device and a magnetic head that is built into the drive cannot be employed in the magnetic recording/reproduction device of the present invention.

The following is an outline of the static en bloc-recording technique using the above master information carrier, which is used for performing preformat recording in accordance with the configuration of the present invention.

Figure 10:
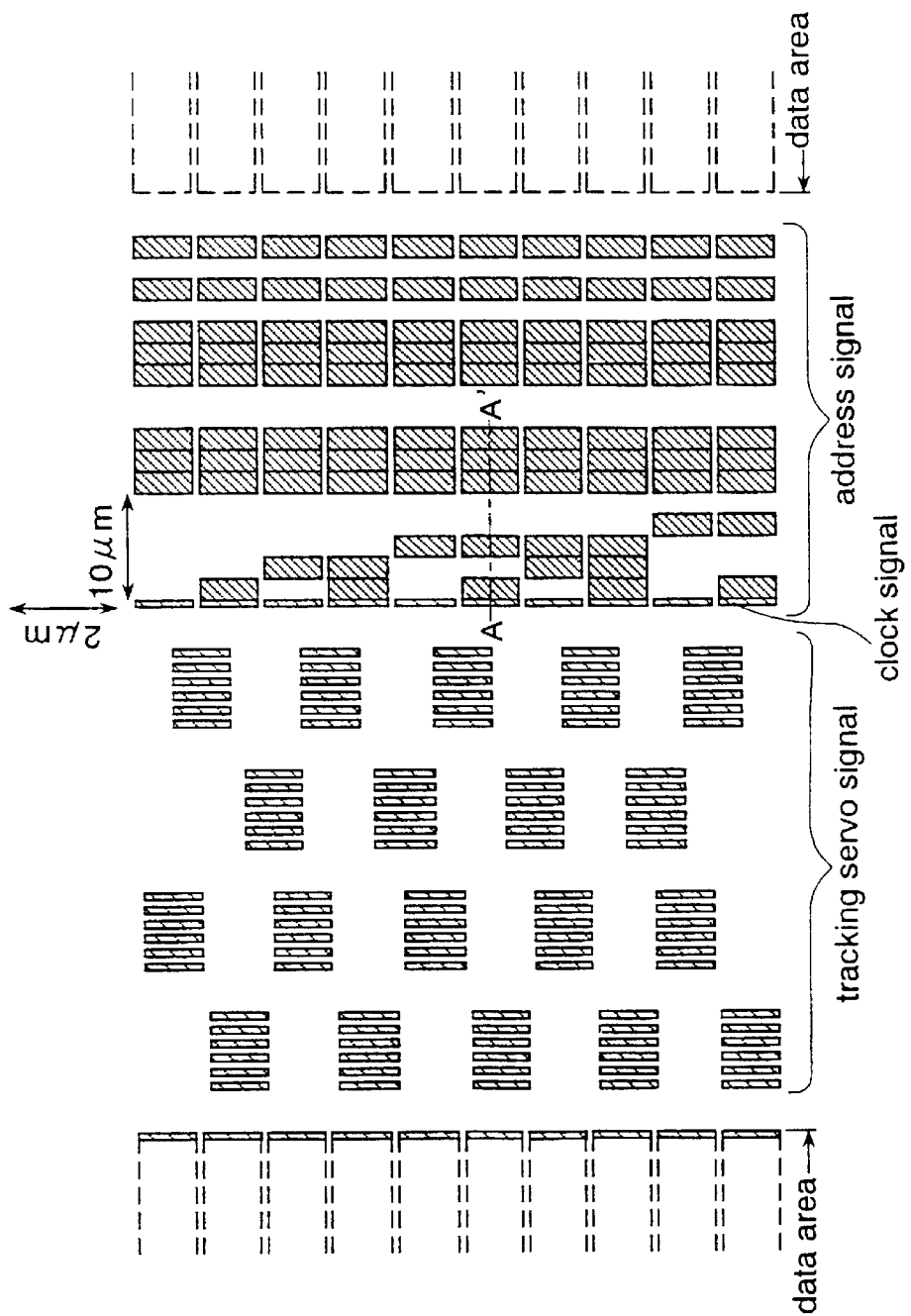
FIG. 10 is a drawing of the surface of a master information carrier used for a preformat recording technique.

FIG. 10 shows an example of a surface of a master information carrier used for this preformat recording technique. FIG. 10 shows a master information pattern to be written in a preformat area that is disposed at a given predetermined angular distance along the circumferential direction (i.e. the direction of the track length) of, for example, a disk-shaped magnetic recording medium (the magnetic disk) for ten tracks in the radial direction (i.e. the direction of the track width) of the disk. Areas defined by broken lines correspond to recording track portions used for data areas in the magnetic disk after writing the master information pattern onto the magnetic disk. In a real master information carrier surface, master information patterns as in FIG. 10 are formed at predetermined angular intervals in the circumferential direction and for all tracks over the whole recording area of the magnetic record disk in the radial direction.

The master information pattern comprises a tracking servo signal area, a clock signal area and an address signal area that are arranged sequentially along the track direction as shown, for example, in FIG. 10. The surface of the master information carrier according to the present invention has a ferromagnetic film pattern corresponding to this master information pattern. Each hatched portion in FIG. 10, for example, is a ferromagnetic film portion on the surface.

The fine ferromagnetic film pattern corresponding to the information signal as shown in FIG. 10 can be formed easily by utilizing a variety of fine processing techniques such as master stamper processes for optical disks or semiconductor processes.

Figure 11:
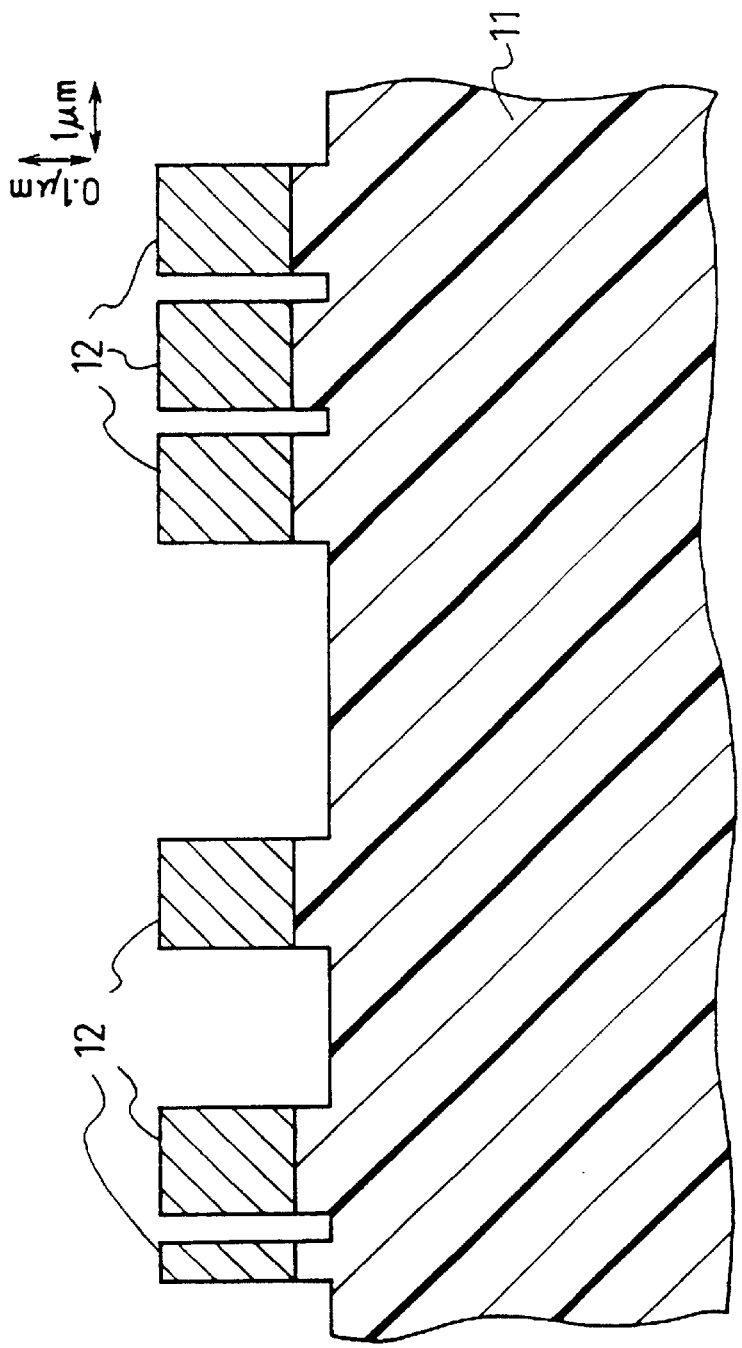
FIG. 11 is an example of a sectional drawing of the master information carrier in the track length direction along the phantom line A–A' in FIG. 10.

FIG. 11 shows an example of a cross section of the master information carrier in FIG. 10 along the phantom line A–A'.

The structure shown in FIG. 11 has been formed by depositing a ferromagnetic film 12 on a surface of a planar substrate 11, applying a resist film to the surface, exposing and developing the resist film to pattern it according to a digital information signal. A fine pattern is formed on the ferromagnetic film 12 with a dry etching technique such as ion milling. In the demonstrated example, the etching depth of the depressed portions reaches into the substrate 11 and the ferromagnetic film 12 remains only at the protruding portions. However, it is also possible to apply an etching depth that is less than the thickness of the ferromagnetic film 12, so that the ferromagnetic film 12 remains at the depressed portions as well as at the protruding portions.

Using the master information carrier as shown in FIGS. 10 and 11, the magnetic recording medium, for example a magnetic disk, is preformat-recorded by contacting the surface of the master information carrier with the surface of the magnetic recording medium. In the case of, for example, an in-plane magnetic recording disk medium, a direct magnetic excitation field is applied in an in-plane direction of the disk, so that the protruding portions of the ferromagnetic film 12 of the master information carrier are magnetized and a preformat information signal corresponding to the ferromagnetic film pattern is recorded in the magnetic recording medium. In this case, when the magnetic disk has been completely deleted before recording the preformat information signal, a sufficient recording close to a saturation recording can be achieved easily.

Compared to conventional methods using a special servo writing device, the above-described preformat recording method requires very little time and is very cheap. Moreover, the magnetization gradient at the recorded track edges is very steep, which enhances the tracking precision.

In the configuration in FIG. 10, the recording width in the radial direction (with respect to the magnetic disk), which is defined by the ferromagnetic film pattern width on the master information carrier, is designed to be substantially the same as the recording track width of a magnetic head. Consequently, when preformat recording of a magnetic disk is performed with the master information carrier in FIG. 10, the recording width of the magnetic bit pattern in the radial direction of the magnetic disk becomes the same as the recording track width of a magnetic head. Thus, the magnetic bit pattern recorded on a magnetic disk with a master information carrier shown as in FIG. 10 and the magnetic bit pattern recorded on a magnetic disk in a conventional manner with a special servo-track writing device and a magnetic head built into the drive are basically the same.

With the above-described preformat recording technique using a master information carrier, it becomes possible to record magnetic bit patterns, that could not be realized with conventional methods using a special servo-track writing device and a magnetic head built into the drive to record a preformat information signal. That is to say, with the above-described preformat recording technique using a master information carrier, the ferromagnetic film pattern on the surface of the master information carrier corresponds to a magnetic bit pattern of a preformat-recorded signal on a magnetic disk. Therefore, the magnetization pattern of a preformat-recorded signal is not as restricted as a conventional preformat recording using a servo-track writing device, and the magnetization pattern of the preformat-recorded signal can be designed arbitrarily by contriving the ferromagnetic film pattern on the surface of the master information carrier accordingly. Thus, a magnetization pattern that can provide optimum performance for handling tracking servo signals, address signals, and clock signals can be preformat-recorded.

The following is a description of the preferred embodiments of the present invention adapted to preformat signals, with reference to the accompanying drawings.

First Embodiment

Figure 1:
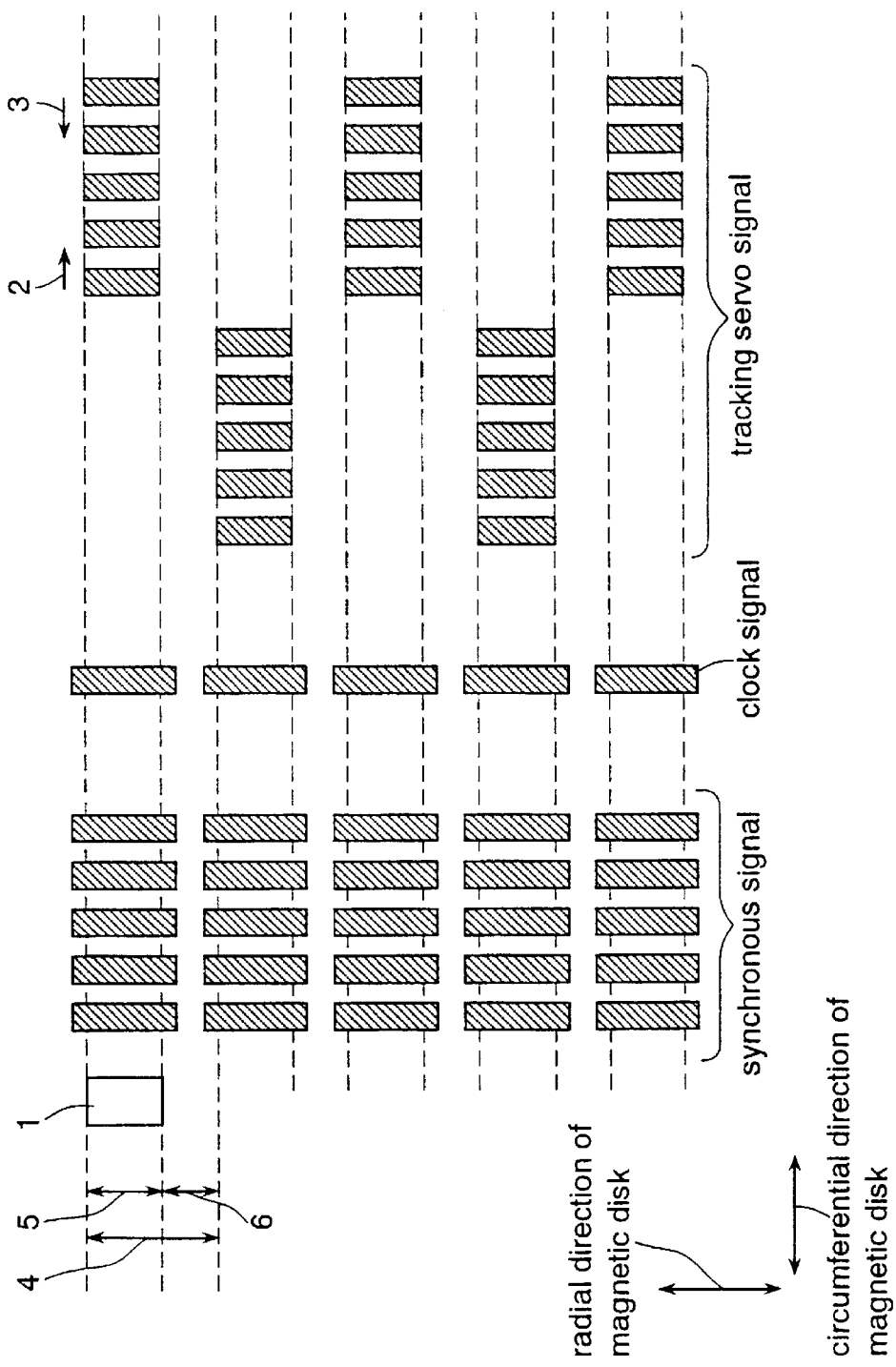
FIG. 1 is a drawing of a magnetization pattern for signals that have been preformat-recorded on a magnetic disk installed in a magnetic recording/reproduction device in accordance with the first embodiment of the present invention.
Figure 2:
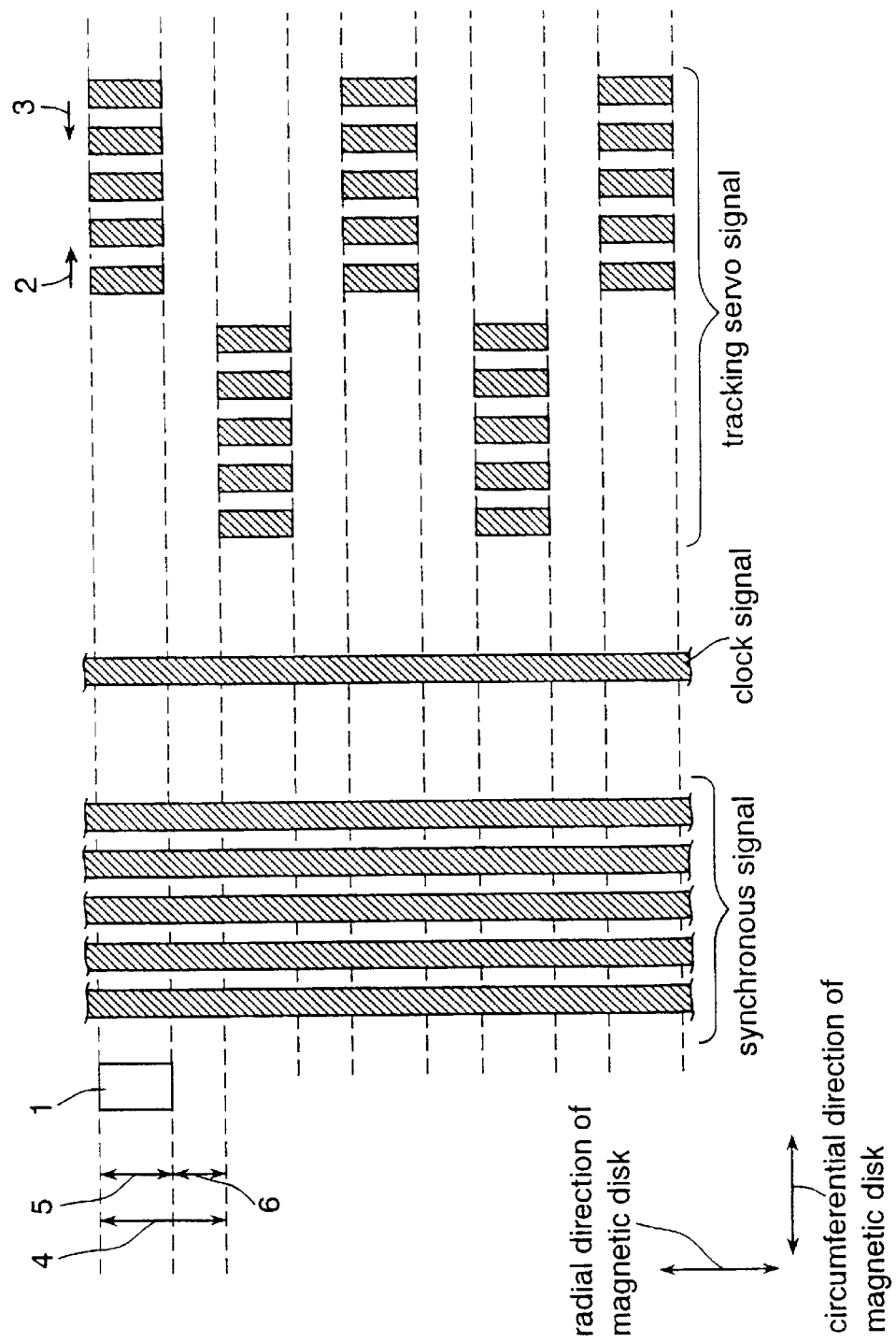
FIG. 2 is a drawing of another magnetization pattern for signals that have been preformat-recorded on a magnetic disk installed in a magnetic recording/reproduction device in accordance with the first embodiment of the present invention.

FIGS. 1 and 2 show an example of the magnetization pattern of a signal that has been preformat-recorded on a magnetic disk installed in a magnetic recording/reproduction device according to the first embodiment of the present invention.

The magnetization pattern in FIGS. 1 and 2 is recorded by contacting the surface of a magnetic disk with a master information carrier, which has the same ferromagnetic film pattern developed on its surface.

Figure 3:
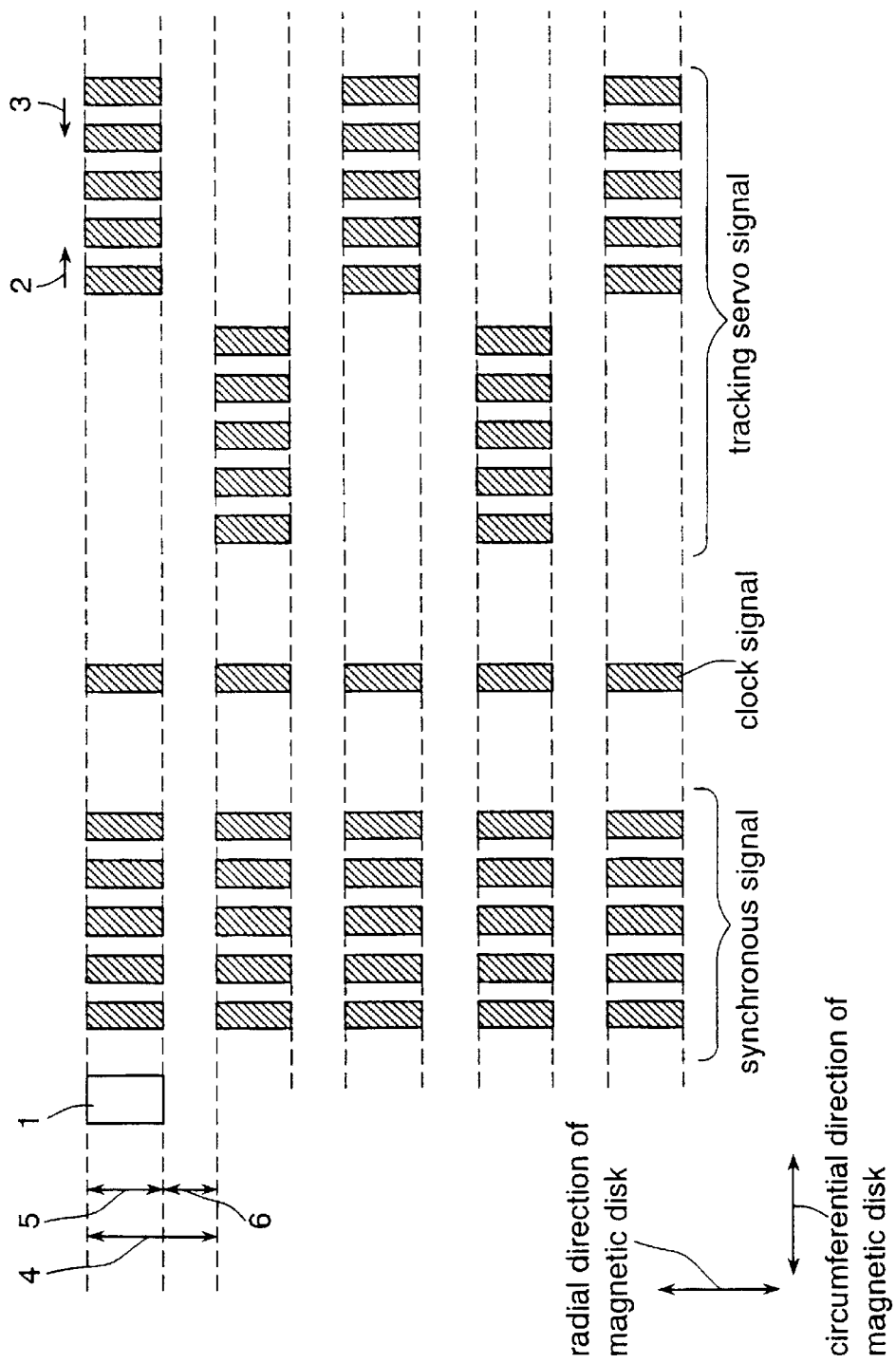
FIG. 3 is a drawing of a conventional magnetization pattern that has been preformat-recorded on a magnetic disk with a special servo-track writing device and a magnetic head built into the drive. The magnetization pattern in FIG. 3 corresponds to those in FIGS. 1 and 2.

For comparison, FIG. 3 illustrates an example of a conventional magnetization pattern that has been preformat-recorded on a magnetic disk with a special servo-track writing device and a magnetic head built into the drive. The pattern in FIG. 3 corresponds to the patterns illustrated in FIGS. 1 and 2.

FIGS. 1 to 3 illustrate an example of a magnetization pattern with several preformat signals recorded in a preformat area provided at certain angle intervals in the circumferential direction (i.e. the direction of the track length) of, for example, a magnetic disk. These preformat signals comprise a tracking servo signal, a clock signal for synchronization, and a synchronous signal that serves as a reference signal for amplitude gain control. In the radial direction of the magnetic disk (i.e. the direction of the track width), five tracks are illustrated. For illustrative reasons, the portion corresponding to the recording track of a magnetic head 1 installed in the device is shown as a broken line.

In the conventional example in FIG. 3, the recording track width cannot be varied arbitrarily in accordance with the kind of signal to be preformat-recorded, because the preformat signal is recorded with a magnetic head 1 that is built into the drive. Consequently, the recording widths of the thus-recorded tracking servo signal, clock signal and synchronous signal are all equal. Moreover, since the recording track width 5 of the magnetic head 1 is usually narrower than the track pitch 4, a guard band 6 of constant width is provided between adjacent recording tracks.

If the magnetic head 1 in the conventional example illustrated in FIG. 3 deviates even only a little from the recording track when scanning the clock signal and the synchronous signal so that it scans an area including a portion of the guard band 6, the amplitude of the read signal decreases. The clock signal and the synchronous signal serve as reference signals for controlling the recording/reproduction system, so that such a decrease of the read signal amplitude is not desirable. Consequently, it is preferable to make the width of the guard band 6 in the preformat recording area of the clock signal and the synchronous signal as small as possible. However, using the techniques of the prior art, this is impossible.

In the configuration of the present invention, however, the magnetization pattern for preformat-recorded signals is not subject to the same restrictions as the prior art, and the width of the guard band 6 in the preformat recording area of the clock signal and the synchronous signal can be made very small.

In the configuration of the present invention shown in FIG. 1, of all the preformat signals shown in the drawing, the recording widths of the clock signal and the synchronous signal in the radial direction of the disk (i.e. in the direction of the track width) are wider than the recording track width 5 of the magnetic head 1. By adopting this configuration, the width of the guard bands 6 in this area can be made extremely small, so that when the magnetic head deviates even only a little from the recording track to be scanned, a decrease of the read signal amplitude can be suppressed.

In the configuration of the present invention shown in FIG. 2, of all the preformat signals shown in the drawing, the recording areas of the clock signal and the synchronous signal traverse a plurality of consecutive recording tracks in the radial direction of the magnetic disk. In this configuration, there is no guard band 6 in the recording areas for the clock signal and the synchronous signal. Consequently, it is possible to eradicate almost completely the decrease of the read signal amplitude that occurs in the prior art when the magnetic head 1 deviates even only a little from the recording track to be scanned. Thus, this configuration is preferable to the configuration in FIG. 1. However, when the recording width in the radial direction of the magnetic disk becomes too large compared to the signal bit length in the circumferential direction (i.e. the direction of the track length), a sufficient recording signal strength may not be attainable, because of the influence of the demagnetizing field due to the recording bit shape. Therefore, it is preferable to select a configuration that is suitable for the recording signal pattern.

In the configurations in FIGS. 1 and 2, the recording width of the tracking servo signal in the radial direction of the magnetic disk is the same as the recording track width 5 of the magnetic head 1. However, the present invention is not limited to these configurations, and the recording width in the tracking servo signal areas can be larger than the recording track width 5 of the magnetic head 1 as well.

Moreover, in the configuration in FIG. 2, the recording areas of the clock signal and the synchronous signal traverse all consecutive recording tracks in the radial direction of the magnetic disk, but it is also possible to group tracks together to certain signal areas in the radial direction of the magnetic disk, and traverse the recording tracks only within these signal areas. In the latter case, there will be guard bands 6 only between the signal groups, but their influence will be significantly lower than in the conventional example in FIG. 3, so that the effect of the present invention can be provided sufficiently. Moreover, the latter configuration is useful in that the effect of the above-mentioned demagnetizing fields can be decreased.

Second Embodiment

Figure 4:
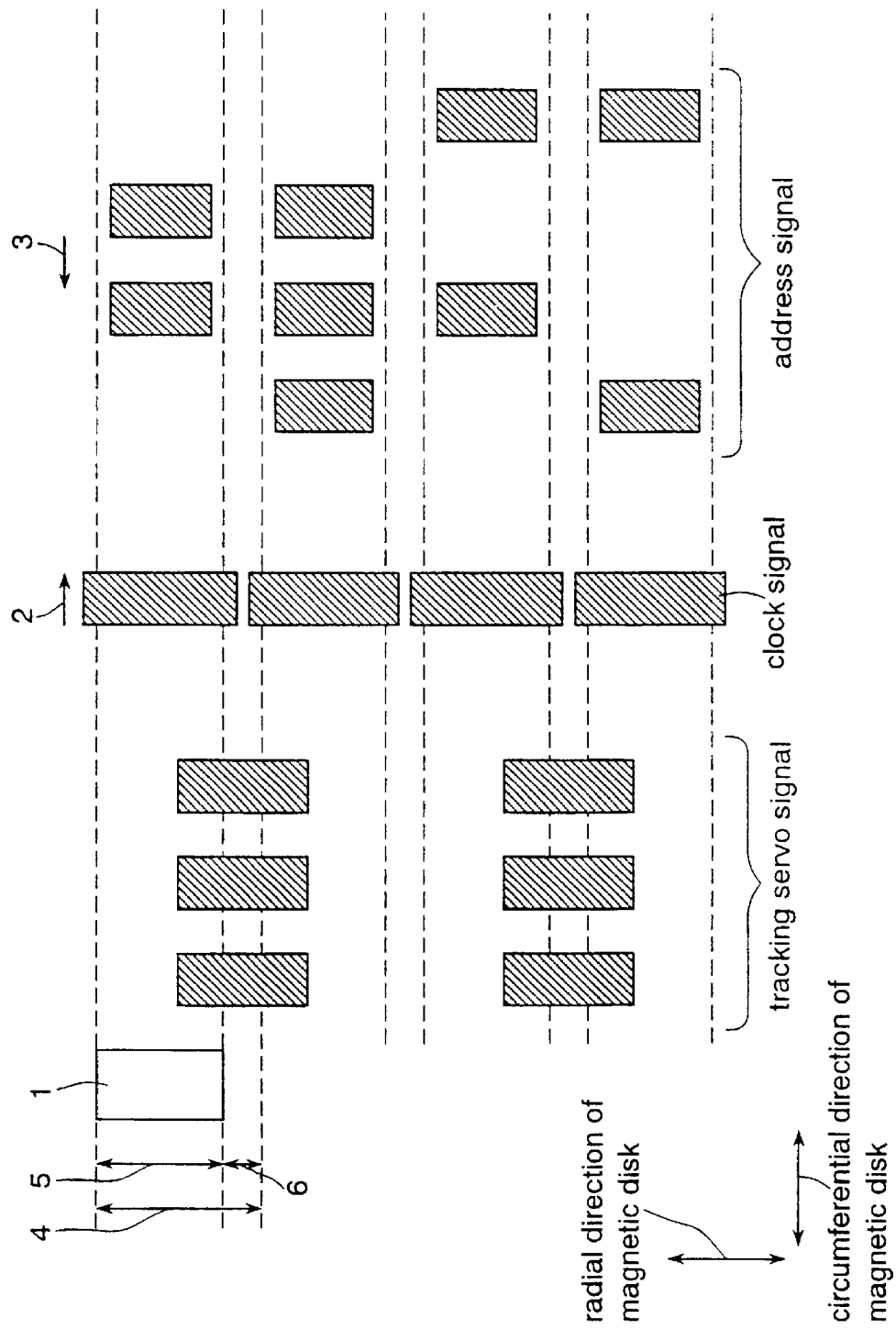
FIG. 4 is a drawing of a magnetization pattern for signals that have been preformat-recorded on a magnetic disk installed in a magnetic recording/reproduction device in accordance with the second embodiment of the present invention.

FIG. 4 shows an example of the magnetization pattern of a signal that has been preformat-recorded on a magnetic disk installed in a magnetic recording/reproduction device according to the second embodiment of the present invention.

The magnetization pattern in FIG. 4 is recorded by contacting the surface of a magnetic disk with a master information carrier, which has the same ferromagnetic film pattern in its surface.

Figure 5:
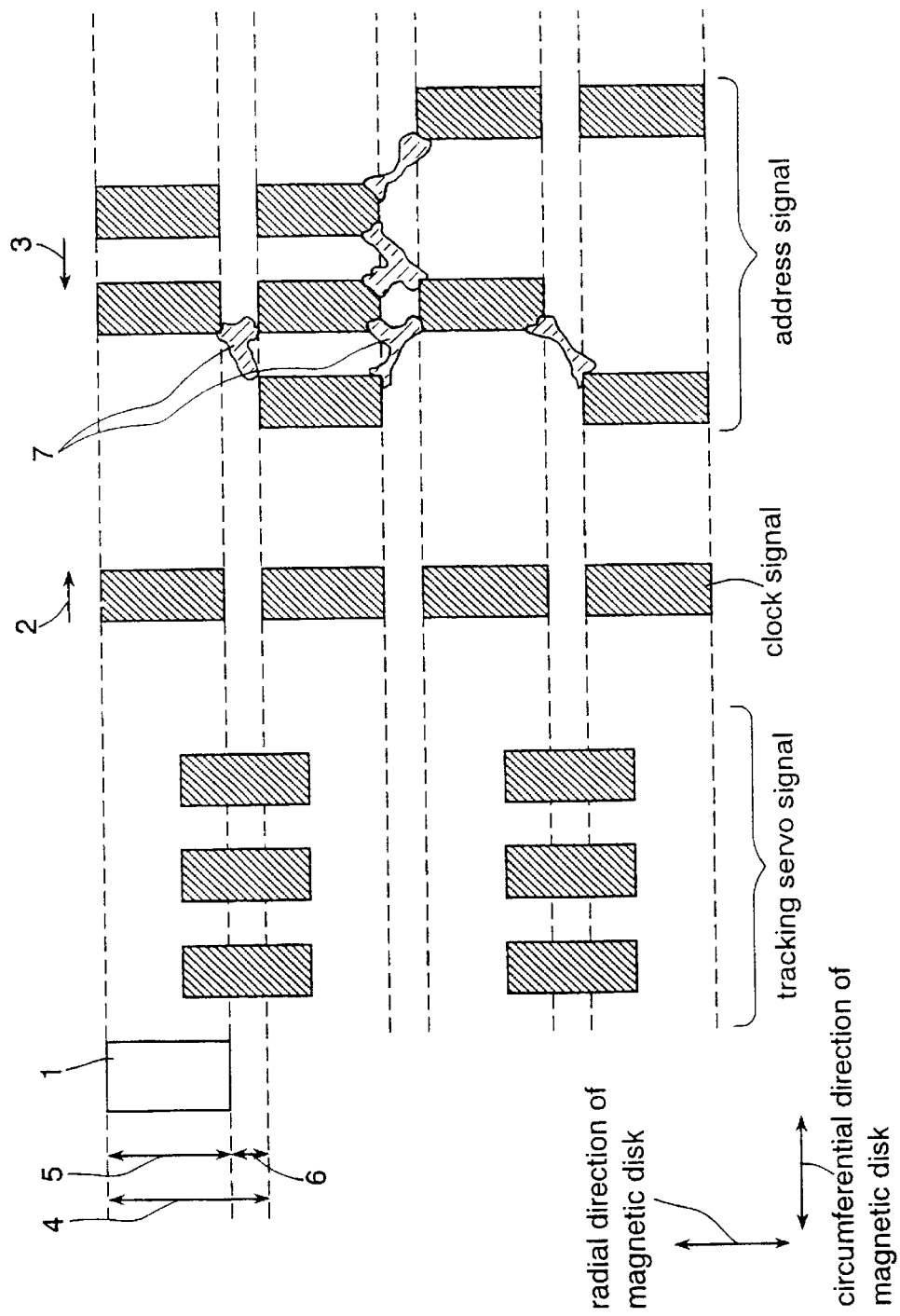
FIG. 5 is a drawing of a magnetization pattern that has been preformat-recorded on a magnetic disk using a master information carrier that has been designed so that the recording widths in the radial direction are the same as the width of the recording track of the magnetic head.

For comparison, FIG. 5 illustrates an example of a magnetization pattern that has been preformat-recorded on a magnetic disk with a master information carrier where the recording widths in the radial direction are designed to be the same as the recording track widths 5 of the magnetic head, as shown for example in FIG. 10. The pattern in FIG. 5 corresponds to the pattern illustrated in FIG. 4.

FIGS. 4 to 5 illustrate an example of a magnetization pattern with several preformat signals recorded in a preformat area provided at certain angle intervals in the circumferential direction (i.e. the direction of the track length) of, for example, a magnetic disk. These preformat signals comprise a tracking servo signal, a clock signal, and an address signal. In the radial direction of the magnetic disk (i.e. the direction of the track width), four tracks are illustrated. For illustrative reasons, the portion corresponding to the recording track of a magnetic head 1 installed in the device is shown as a broken line.

In the conventional example in FIG. 5, the recording track width of the preformatted signals is the same as the recording track width 5 of the magnetic head 1. Consequently, the recording widths of the tracking servo signal, clock signal and address signal are all equal. Moreover, as in the case of recording the preformat signal with a special servo-track writing device and a magnetic head built into the drive, the width of the guard band 6 provided between adjacent recording tracks is the same for all signal areas.

Of the preformat signals, the address signal includes a track number indicating the radial position and a sector number indicating the circumferential position on the surface of the magnetic disk. Therefore, in the recording portion on the magnetic disk corresponding to the address signal, not a simple repetitive periodic signal as the tracking servo signal and the synchronous signal, but a complicated bit pattern is recorded. When such a complicated bit pattern is recorded as shown in the example in FIG. 5, interference arises among bits of adjacent tracks, and the recording magnetization develops complicated unstable magnetization interference areas 7 across the guard bands 6. These magnetization interference areas 7 between adjacent bits are undesirable, because they cause noise at signal reproduction and may cause address detection errors and a decrease of the seek velocity. The occurrence of such magnetization interference areas 7 has been recognized also in conventional preformat recordings using a special servo-track writing device and a magnetic head built into the drive, and it is becoming a serious problem considering that magnetic recording/reproduction devices record with ever higher track density.

To reduce this interference between adjacent bits, it is preferable that the width of the guard band 6 in the preformat recording area of the address signal is as large as possible. On the other hand, as explained above, a large guard band width is not desirable in the preformat recording area for the clock signal and the synchronous signal. This means that in the conventional preformat recording method the recording track width 5 of the magnetic head 1 and the width of the guard band 6 cannot be arbitrarily changed, but there is a trade-off between the two.

On the other hand, with the configuration of the present invention, the magnetization pattern of the preformat-recorded signals is not restricted as in the prior art, and the width of the guard band 6 can be optimized for all preformat recording areas, that is, for address signal, clock signal and synchronous signal.

In the configuration shown in FIG. 4, of all the preformat signals in the drawing, the recording width of the clock signal in the radial direction of the magnetic disk (that is in the direction of the track width) is larger than the recording track width 5 of the magnetic head 1, and the recording width of the address signal in the radial direction of the magnetic disk is smaller than the recording track width 5 of the magnetic head 1. By adopting this configuration, the width of the guard band 6 can be made extremely small in the clock signal area and extremely large in the address signal area. This means that when the magnetic head 1 in the clock signal area deviates even only a little from the recording track to be scanned, a decrease of the read signal amplitude can be suppressed. On the other hand, magnetization interference areas 7 among adjacent bits as shown in FIG. 5 do not occur in the area of the address signal information.

Care needs to be taken that the recording width of the magnetic bit pattern in the address signal area is not too small, because then the read output amplitude of this signal becomes too small. However, in dual-element magnetic heads including an inductive recording element and a magnetoresistive reproduction element, such as are installed in magnetic recording/reproduction disk devices of recent years, the recording track width of the recording element portion is smaller than track pitch and the reproduction track width of the reproduction element portion is even smaller than the recording track width. Therefore, in the range where the present invention sufficiently displays its effect, the read output amplitude of the address signal does not decrease drastically, even when the recording width of the magnetic bit pattern in the address signal area is made smaller. Rather, a high reproduction S/N ratio can be attained by decreasing the noise caused by the above-described magnetization interference areas 7.

In the configuration shown in FIG. 4, the recording area of the clock signal can be formed as traversing a plurality of consecutive recording tracks in the radial direction of the magnetic disk, as in the configuration shown in FIG. 2.

Moreover, in the configuration shown in FIG. 4, the recording width of the tracking servo signal in the radial direction of the magnetic disk is set to the same width as the recording track width 5 of the magnetic head 1. However, the present invention is not restricted to this configuration, and also the recording width in the tracking servo signal area can be set larger than the recording track width 5 of the magnetic head 1.

Third Embodiment

Figure 6:
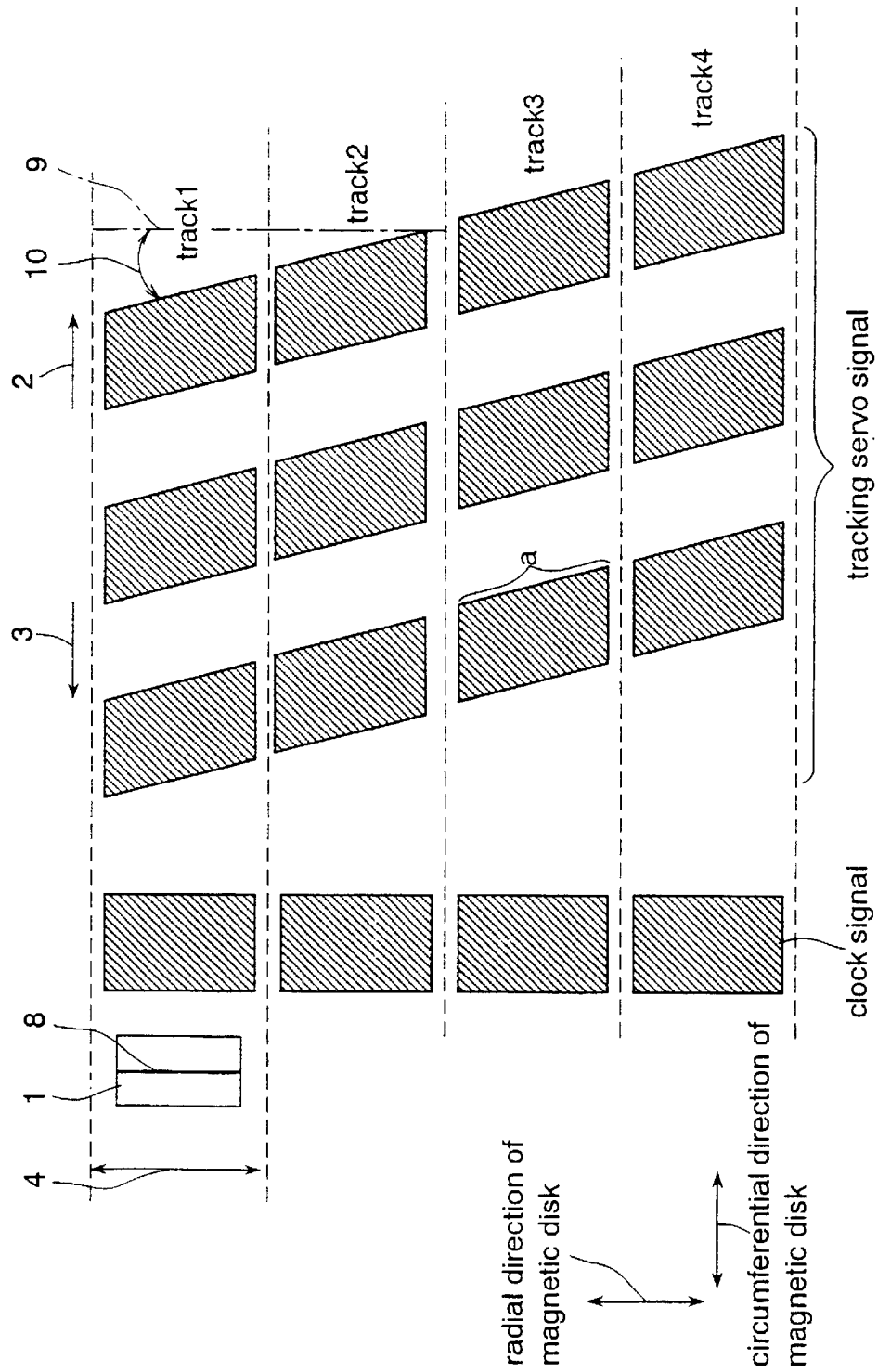
FIG. 6 is a drawing of a magnetization pattern for signals that have been preformat-recorded on a magnetic disk installed in a magnetic recording/reproduction device in accordance with the third embodiment of the present invention.
Figure 7:
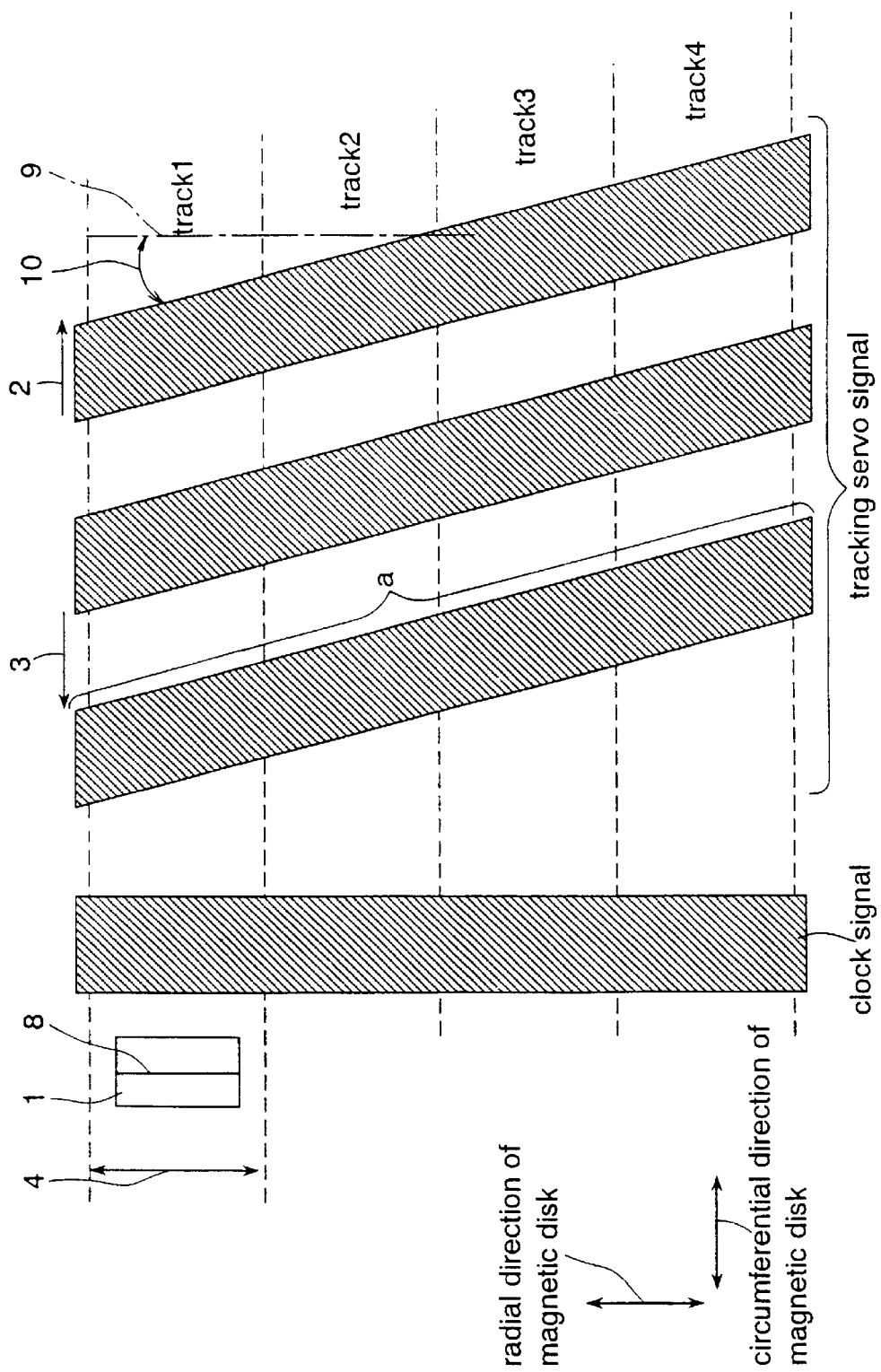
FIG. 7 is a drawing of another magnetization pattern for signals that have been preformat-recorded on a magnetic disk installed in a magnetic recording/reproduction device in accordance with the third embodiment of the present invention.

FIGS. 6 and 7 show an example of the magnetization pattern of a signal that has been preformat-recorded on a magnetic disk installed in a magnetic recording/reproduction device according to the third embodiment of the present invention.

The magnetization pattern in FIGS. 6 and 7 is recorded by contacting the surface of a magnetic disk with a master information carrier, which has the same ferromagnetic film pattern deposited in its surface.

Figure 8:
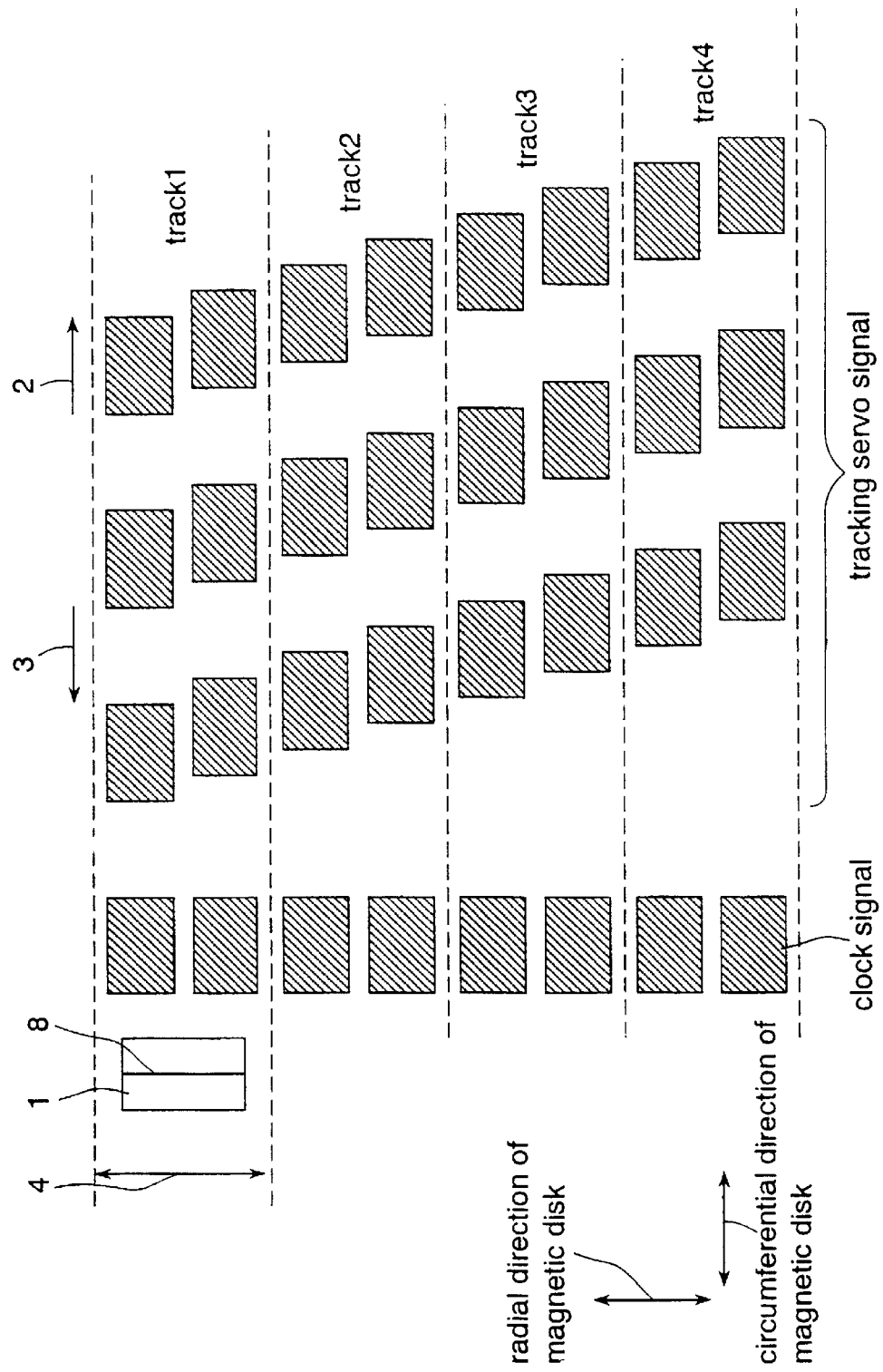
FIG. 8 is a drawing of a conventional magnetization pattern that has been preformat-recorded on a magnetic disk with a special servo-track writing device and a magnetic head built into the drive. The magnetization pattern in FIG. 8 corresponds to those in FIGS. 6 and 7.

For comparison, FIG. 8 illustrates an example of a conventional magnetization pattern that has been preformat-recorded on a magnetic disk with a special servo-track writing device and a magnetic head built into the drive. The pattern in FIG. 8 corresponds to the patterns illustrated in FIGS. 6 and 7.

FIGS. 6 to 8 illustrate an example of a magnetization pattern with several preformat signals recorded in a preformat area provided at certain angle intervals in the circumferential direction (i.e. the direction of the track length) of, for example, a magnetic disk. These preformat signals comprise a clock signal, and a tracking servo signal. In the radial direction of the magnetic disk (i.e. the direction of the track width), four tracks are illustrated. For illustrative reasons, the portions corresponding to the track pitch 4 have been marked by broken lines and numbered simply as tracks 14, to clarify the position of the recording tracks.

In present tracking servo techniques, the displacement of the magnetic head 1 in the radial direction from a predetermined track center line is generally: both detected and controlled based on the read signal amplitude of the tracking servo signal recorded in a plurality of adjacent tracks and between the tracks. The tracking servo signal patterns shown for example in FIGS. 1–5 and 10 use this tracking servo technique and control the displacement of the magnetic head 1 in the radial direction of the magnetic disk based on this read signal amplitude. However, this technique poses the problems that the frequency band of the position signal detection circuit increases together with the track density, and that noise influences the tracking precision.

As a countermeasure, therefore, Publication of Unexamined Patent Application No. Sho 60-10472 discloses a tracking servo technique based on phase detection of the read signal. FIG. 8 shows an example of a magnetization pattern for a tracking servo signal used by the tracking servo technique based on phase detection as disclosed in this publication. In the tracking servo technique disclosed in this publication, a magnetic bit pattern is recorded with a constant phase shift for every half track on the magnetic disk, as shown for example in FIG. 8. When such a tracking servo signal is read with a magnetic head 1 having a reproduction track width in the radial direction that is larger than half the track pitch, then the magnetic head 1 encounters a phase shift of the reproduction signal in accordance with its own displacement in the radial direction of the magnetic disk. According to this technique, the displacement of the magnetic head 1 in the radial direction of the magnetic disk can be detected from the phase shift of the read signal so that tracking can be performed such that the magnetic head 1 precisely scans the intended recording track.

To employ this tracking servo technique, which is based on the phase detection of the read signal, with maximum effectiveness, it is preferable that the phase of the reproduced servo signal changes gradually and linearly with the radial displacement of the magnetic head 1. Regarded this way, it is preferable that the magnetization pattern of the tracking servo signal recorded on the magnetic disk follows a gradual and linear phase shift within each single track and between adjacent tracks and not a pattern of constant phase shift for each half track, as shown in FIG. 8.

However, in conventional methods that perform the preformat recording using a special servo-track writing device, recording the preformat signals with a magnetic head built into the drive imposed structural limitations that made a preformat recording of a magnetization pattern with a gradual and linear phase shift, which has to be regarded as preferable for a tracking servo technique based on phase detection, difficult. Therefore, a configuration had to be adopted where the phase shift proportional to the displacement of the magnetic head 1 was approximated by recording a magnetization pattern with a stepped phase shift, as shown in FIG. 8.

When a magnetization pattern with a stepped phase shift, as shown in FIG. 8, is used, the tracking servo technique, which is based on the phase detection of the read signal, cannot provide sufficient tracking precision. Moreover, to record the magnetization pattern in FIG. 8, the recording track width of the magnetic head 1 installed in the device has to be made as somewhat less than the track pitch 4. Since this magnetic head 1 is also used for recording regular data signals, the recording track width of the data signals becomes somewhat less than the track pitch 4, and the read output amplitude of the data signals decreases more than necessary. Moreover, in the conventional methods that use a special servo-track writing device for the preformat recording, a two-tier bit pattern has to be recorded for every track, so that the time necessary for the preformat recording becomes extremely long, and the phase of the recording signal and the position of the magnetic head 1 become extremely difficult to control with external actuators.

Fastforwarding 10 years from the time when the tracking servo technique based on the phase detection of the read signal has been proposed, tracking servo techniques for magnetic recording/reproduction devices based on the amplitude detection of the read signal have now become mainstream.

On the other hand, the magnetization pattern for preformat-recorded signals in the configuration of the present invention is not as limited as the prior art. In accordance with the present invention, it is possible to record magnetization patterns with a gradual and linear phase shift optimized for servo tracking techniques based on phase detection of the read signal.

In the configurations of the present invention shown in FIGS. 6 and 7, of the preformat signals recorded on the magnetic disk, the magnetic transition region between the bits in the bit pattern corresponding to the tracking servo signal has an inclination angle 10 with respect to the reproduction gap of the magnetic head 1. Here, "magnetic transition region" means the border portion between adjacent bits having opposite magnetization polarity in the circumferential direction of the magnetic disk. In FIGS. 6 and 7, the border line between the hatched bit portions and the unhatched bit portions (for example the portion "a") is the magnetic transition region. In this area, the magnetization polarity 2 of the hatched portions opposes the magnetization polarity of the unhatched portions. In fact, over a limited, narrow area, the magnetization polarization 2 shifts gradually into the opposite polarization 3, hence it is called magnetic transition region.

When a magnetic head 1 having a read gap direction 9 that is substantially parallel to the radial direction of the disk is used to read a tracking servo signal as shown in FIGS. 6 and 7, then the magnetic head 1 encounters a phase shift of the read signal that is proportional to its own displacement in the radial direction of the magnetic disk 1. Consequently, with the magnetic recording/reproduction device of the present invention, the displacement of the magnetic head 1 in the radial direction of the magnetic disk can be detected from such a phase shift of the read signal so that tracking can be performed such that the magnetic head 1 precisely scans the intended recording track.

Different from the conventional configuration shown in FIG. 8, the magnetic head 1 in the configurations shown in FIGS. 6 and 7 can detect a truly gradual and linear phase shift of the read signal that is proportional to its own displacement in the radial direction of the magnetic disk. Thus, a servo tracking technique based on a phase detection of the read signal can provide excellent tracking precision. Moreover, with a configuration according to the present invention, a preformat signal can be recorded en bloc using a master information carrier, as has been explained above, so that the various problems occurring when preformat recording with a special servo-track writing device as in the configuration shown in FIG. 8 can be solved. Consequently, a magnetic recording/reproduction device employing the configuration of the present invention can be devised much cheaper than a conventional magnetic recording/reproduction device.

In the configuration of the present invention, the recording areas of the clock signal and the tracking servo signal can be separated by a guard band between adjacent tracks as shown in FIG. 6, or the recording areas of the clock signal and the servo signal can traverse a plurality of consecutive recording tracks as shown in FIG. 7. The guard band width can be made extremely small, as shown in FIG. 6, and it is preferable that the recording width of the clock signal and the tracking servo signal in the radial direction of the magnetic disk is larger than the read track width of the read head or the recording track width of the recording head.

The configuration of the present invention, where an inclination angle 10 is defined by (a) the magnetic transition region between the bits and (b) the read gap 8 of the magnetic head 1, cannot only be adapted to tracking servo signals, but also to a variety of other signals. Also, by adopting an inclination angle defined by (a) the magnetic transition region between the bits and (b) the read gap 8 of the magnetic head 1 for recording other preformat signals such as address signals and synchronous signals, a magnetization pattern optimized for each signal can be provided, and the intended characteristics can be improved. In accordance with the signal and the magnetization pattern, this can be combined with a recording width of the signal in the radial direction of the magnetic disk that is smaller than the recording track width 5 of the magnetic head 1, as in the example of an address signal shown in FIG. 4.

Fourth Embodiment

Figure 9:
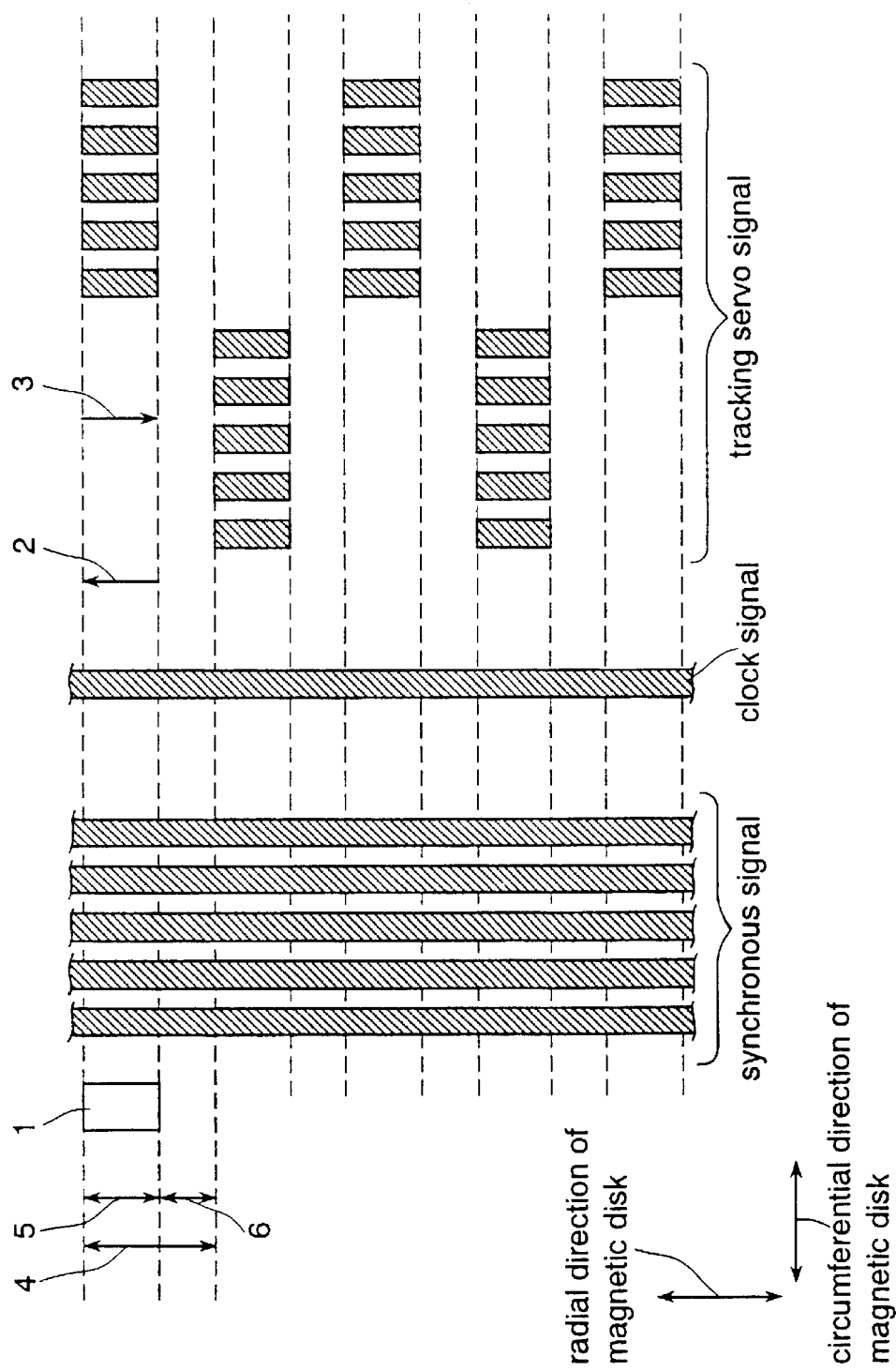
FIG. 9 is a drawing of a magnetization pattern for signals that have been preformat-recorded on a magnetic disk installed in a magnetic recording/reproduction device in accordance with the fourth embodiment of the present invention.

FIG. 9 shows an example of the magnetization pattern of a signal that has been preformat-recorded on a magnetic disk installed in a magnetic recording/reproduction device according to the fourth embodiment of the present invention.

The magnetization pattern in FIG. 9 is basically the same as the magnetization pattern in FIG. 2. However, in the configuration shown in FIG. 2, the magnetization bits corresponding to preformat information are magnetized in the circumferential direction of the magnetic disk, whereas in the configuration shown in FIG. 9, the magnetization bits corresponding to preformat information are magnetized substantially parallel to the radial direction of the magnetic disk. This means, in the configuration shown in FIG. 2, the magnetization polarity 2 of the hatched portions and the magnetization polarity 3 of the unhatched portions are anti-polar to each other in the circumferential direction of the magnetic disk, whereas in the configuration shown in FIG. 9, the magnetization polarity 2 of the hatched portions and the magnetization polarity 3 of the unhatched portions are anti-polar to each other in the radial direction of the magnetic disk.

The magnetization patterns in FIGS. 2 and 9 are both recorded by contacting the surface of a magnetic disk with a master information carrier, which has the same ferromagnetic film pattern in its surface. However, to record the magnetization pattern in FIG. 2, a master information carrier is used, wherein the ferromagnetic film portions are magnetized in the circumferential direction of the magnetic disk. On the other hand, to record the magnetization pattern in FIG. 9, a master information carrier is used, wherein the ferromagnetic film portions are magnetized in the radial direction of the magnetic disk.

The configuration shown in FIG. 9 has the advantage that a sufficient recording signal strength can be easily attained even when the recording width in the radial direction of the magnetic disk is much larger than the signal bit length in the circumferential direction. As has been explained for the first embodiment with reference to FIG. 2, demagnetization loss occurs because of the demagnetizing field accompanying this recording bit shape, when the signal bit length in the circumferential direction of the magnetic disk is small and the recording width in the radial direction is comparatively large, so that a sufficient recording signal strength may not be attainable. In the configuration of FIG. 9, on the other hand, the magnetization remains in a direction where demagnetization loss due to the demagnetizing field does not occur so easily, so that demagnetization loss does not occur and a sufficient recording signal strength can be attained easily. Thus, with this configuration of the present invention, a recording magnetization direction that is suitable for the preformat information signal pattern can be selected.

The magnetic head 1 installed in a magnetic recording/reproduction device in accordance with the present invention having the configuration of FIG. 9 has to have a suitable gap to detect a polarization change of the magnetization recorded in the radial direction of the magnetic disk.

In the foregoing, four embodiments of the present invention are explained. However, the present invention is not limited to these embodiments, but can be applied also to various other devices.

For example, the above embodiments have been explained with the main focus on hard disk drives as the magnetic recording/reproduction devices. However, the present invention is not limited to hard disk drives and can equally be applied to other magnetic recording/reproduction devices such as flexible magnetic disk devices whose disks can be exchanged. Such a configuration can attain the same advantages as explained above.

Moreover, the above embodiments have been explained with the main focus on devices using in-plane magnetic recording disks. However, the present invention can equally be applied to devices using perpendicular magnetic recording disks. Such a configuration can attain the same advantages as explained above.

Moreover, the above embodiments have been explained with the main focus on preformat information signals, such as a tracking servo signal, an address signal, a clock signal, and a synchronous signal, which are recorded on the magnetic disk. However, the information signals to which the present invention can be applied are not limited to these signals. By applying the present invention, a magnetic recording/reproduction device where various data signals such as for example audio or video signals have been recorded en bloc can be provided at low cost. The possibilities to aim at improving the intended characteristics can be enlarged much more when performing preformat recording, and a suitable recording magnetization pattern can be designed according to each kind of signal.

As has been explained above, the present invention makes magnetization patterns, that can be optimized so that the preformat recording of a magnetic recording/reproduction device can provide optimum performance for each kind of signal possible. Consequently, a magnetic recording/reproduction device with excellent performance in such areas as tracking performance, seek performance and reliability can be provided at lower cost than before. Moreover, an even higher track density can be realized with a magnetic recording/reproduction device in accordance with the present invention.

What is claimed is:

1. A magnetic disk for a magnetic recording/reproduction device having a magnetic head, wherein
   a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to at least one signal selected from a clock signal and a synchronous signal has a recording width that is larger than a recording track width of the magnetic head in a radial direction of the magnetic disk.

2. A magnetic disk for a magnetic recording/reproduction device having a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to a tracking servo signal has a recording width that is larger than a recording track width of the magnetic head in a radial direction of the magnetic disk.

3. A magnetic disk for a magnetic recording/reproduction device having a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to an address information signal has a recording width that is smaller than a recording track width of the magnetic head in a radial direction of the magnetic disk.

4. A magnetic disk for a magnetic recording/reproduction device having a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to at least one signal selected from a block signal and a synchronous signal traverses plurality of consecutive recording tracks in a radial direction of the magnetic disk.

5. A magnetic disk for a magnetic recording/reproduction device having a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, in the magnetization bit-pattern, a magnetic transition region between bits in a tracking servo signal region is inclined with respect to a read gap of the magnetic head, and a portion of the magnetization bit-pattern corresponding to the tracking servo signal has a recording width that is larger than at least one of a read track width and a recording track width of the magnetic head in a radial direction of the magnetic disk.

6. A magnetic disk for a magnetic recording/reproduction device having a magnetic head, wherein a magnetization bit-pattern corresponding to a preformat information signal is recorded beforehand on the magnetic disk, in the magnetization bit-pattern, a magnetic transition region between bits in a clock signal region is inclined with respect to a read gap of the magnetic head, and a portion of the magnetization bit-pattern corresponding to the clock signal has a recording width that is larger than at least one of a read track width and a recording track width of the magnetic head in a radial direction of the magnetic disk.

7. The magnetic disk according to claim 6, wherein the magnetization bit-pattern is recorded by contacting a surface of the magnetic disk with a surface of a master information carrier having a pattern corresponding to the preformat information signal.

8. A magnetic disk for a magnetic recording/reproduction device having a magnetic head, wherein a magnetization bit-pattern corresponding to a preformat information signal is recorded beforehand on the magnetic disk, in the magnetization bit-pattern, a magnetic transition region between bits in an address information signal region is inclined with respect to a read gap of the magnetic head, and a portion of the magnetization bit-pattern corresponding to the address information signal has a recording width that is smaller than at least one of a read track width and a recording track width of the magnetic head in a radial direction of the magnetic disk.

9. The magnetic disk according to claim 8, wherein the magnetization bit-pattern is recorded by contacting a surface of the magnetic disk with a surface of a master information carrier having a pattern corresponding to the preformat information signal.

10. A magnetic disk for a magnetic recording/reproduction device having a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, in the magnetization bit-pattern, a magnetic transition region between bits in a tracking servo signal region is inclined with respect to a read gap of the magnetic head, and a portion of the magnetization bit-pattern in the tracking servo signal region traverses a plurality of consecutive recording tracks in a radial direction of the magnetic disk.

11. A magnetic disk for a magnetic recording/reproduction device having a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, in the magnetization bit-pattern, a magnetic transition region between bits in a clock signal region is inclined with respect to a read gap of the magnetic head, and a portion of the magnetization bit-pattern in the clock signal region traverses a plurality of consecutive recording tracks in a radial direction of the magnetic disk.

12. The magnetic disk according to any one of claims 1 to 11, wherein at least a potion of the magnetization bit-pattern is magnetized substantially parallel to a radial direction of the magnetic disk.

13. The magnetic disk according to any one of claims 1 to 11, wherein at least a portion of the magnetization bit-pattern is magnetized along a circumferential direction of the magnetic disk.

14. The magnetic disk according to any one of claims 1 to 11, wherein the magnetic disk is an exchangeable disk that can be inserted into and retrieved from the magnetic recording/reproduction device.

15. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to at least one signal selected from a clock signal and a synchronous signal has a recording width that is larger than a recording track width of the magnetic head in a radial direction of the magnetic disk.

16. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to a tracking servo signal has a recording width that is larger than a recording track width of the magnetic head in a radial direction of the magnetic disk.

17. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to an address information signal has a recording width that is smaller than a recording track width of the magnetic head in a radial direction of the magnetic disk.

18. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, and a portion of the magnetization bit-pattern corresponding to at least one signal selected from a clock signal and a synchronous signal traverses a plurality of consecutive recording tracks in a radial direction of the magnetic disk.

19. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, in the magnetization bit-pattern, a magnetic transition region between bits in a tracking servo signal region is inclined with respect to a read gap of the magnetic head, and a portion of the magnetization bit-pattern corresponding to the tracking servo signal has a recording width that is larger than at least one of a read track width and a recording track width of the magnetic head in a radial direction of the magnetic disk.

20. A magnetic recording/reproduction device comprising a magnetic disk and a magnetic head, wherein a magnetization bit-pattern corresponding to a preformat information signal is recorded beforehand on the magnetic disk, in the magnetization bit-pattern, a magnetic transition region between bits in a clock signal region is inclined with respect to a read gap of the magnetic head, and a portion of the magnetization bit-pattern corresponding to the clock signal has a recording width that is larger than at least one of a read track width and a recording track width of the magnetic head in a radial direction of the magnetic disk.

21. The magnetic recording/reproduction device according to claim 20, wherein the magnetization bit-pattern is recorded by contacting a surface of the magnetic disk with a surface of a master information carrier having a pattern corresponding to the preformat information signal.

22. A magnetic recording/reproduction device comprising a magnetic disk and a magnetic head, wherein a magnetic bit-pattern corresponding to a preformat information signal is recorded beforehand on the magnetic disk, in the magnetization bit-pattern, a magnetic transition region between bits in an address information signal region is inclined with respect to a read gap of the magnetic head, and a portion of the magnetization bit-pattern corresponding to the address information signal has a recording width that is larger than at least one of a read track width and a recording track width of the magnetic head in a radial direction of the magnetic disk.

23. The magnetic recording/reproduction device according to claim 22, wherein the magnetization bit-pattern is recorded by contacting a surface of the magnetic disk with a surface of a master information carrier having a pattern corresponding to the preformat information signal.

24. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, in the magnetization bit-pattern, a magnetic transition region between bits in a tracking servo signal region is inclined with respect to a read gap of the magnetic head, and the region for recording the tracking servo signal traverses a plurality of consecutive recording tracks in a radial direction of the magnetic disk.

25. A magnetic recording/reproduction device comprising a magnetic disk and a magnetic head, wherein a magnetization bit-pattern corresponding to a preformat information signal is recorded beforehand on the magnetic disk, wherein the magnetization bit-pattern is recorded by contacting a surface of the magnetic disk with a surface of a master information carrier having a pattern corresponding to the preformat information signal, in the magnetization bit-pattern, a magnetic transition region between bits in a clock signal region is inclined with respect to a read gap of the magnetic head, and the region for recording the clock signal traverses a plurality of consecutive recording tracks in a radial direction of the magnetic disk.

26. The magnetic recording/reproduction device according to any one of claims 15 to 25, wherein at least a portion of the magnetization bit-pattern is magnetized substantially parallel to a radial direction of the magnetic disk.

27. The magnetic recording/reproduction device according to any one of claims 15 to 25, wherein at least a portion of the magnetization bit-pattern is magnetized along a circumferential direction of the magnetic disk.

28. The magnetic recording/reproduction device according to any one of claims 19 and 24, wherein at least in a portion of the magnetization bit-pattern corresponding to a tracking servo signal, an inclination angle is defined by (a) the magnetic transition region between bits and (b) the read gap of the magnetic head, and the magnetic recording/reproduction device further comprises a controller that controls the tracking of the magnetic head by detecting a phase change of a read waveform of the tracking servo signal that accompanies a displacement of the magnetic head in a radial direction of the magnetic disk.

29. The magnetic recording/reproduction device according to any one of claims 15 to 25, wherein the magnetic disk is an exchangeable disk that can be inserted into and retrieved from the magnetic recording/reproduction device.

* * * * *

UNITED STATES PATENT AND TRADEMARK OFFICE
CERTIFICATE OF CORRECTION

PATENT NO. : 6,529,341 B1
DATED : March 4, 2003
INVENTOR(S) : Tatsuaki Ishida et al.

It is certified that error appears in the above-identified patent and that said Letters Patent is hereby corrected as shown below:

Column 17,
Line 47, replace "block" with -- clock --.

Signed and Sealed this

Ninth Day of September, 2003

JAMES E. ROGAN
*Director of the United States Patent and Trademark Office*